United States Patent
Butzmann

(10) Patent No.: US 9,362,760 B2
(45) Date of Patent: Jun. 7, 2016

(54) BATTERY HAVING A PLURALITY OF BATTERY CELLS AND METHOD FOR REGULATING A BATTERY VOLTAGE OF A BATTERY USING SWITCH-ON PROBABILITIES OF THE BATTERY CELLS

(71) Applicants: Robert Bosch GmbH, Stuttgart (DE); Samsung SDI Co., Ltd., Yongin-si, Gyeonggi-do (KR)

(72) Inventor: Stefan Butzmann, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 108 days.

(21) Appl. No.: 14/166,967

(22) Filed: Jan. 29, 2014

(65) Prior Publication Data

US 2014/0210380 A1    Jul. 31, 2014

(30) Foreign Application Priority Data

Jan. 30, 2013    (DE) .......................... 10 2013 201 489

(51) Int. Cl.
| | |
|---|---|
| H02P 1/00 | (2006.01) |
| H02J 7/00 | (2006.01) |
| B60L 3/12 | (2006.01) |
| B60L 11/18 | (2006.01) |

(52) U.S. Cl.
CPC ................ H02J 7/0024 (2013.01); B60L 3/12 (2013.01); B60L 11/1864 (2013.01); B60L 11/1866 (2013.01); H02J 7/0065 (2013.01); *B60L 2240/547* (2013.01); *Y02T 10/7005* (2013.01); *Y02T 10/7055* (2013.01); *Y02T 10/7061* (2013.01)

(58) Field of Classification Search
CPC ..... H02J 7/007; Y02T 10/7005; Y02T 10/70; Y02T 10/7077
USPC .......................................... 318/139; 320/106
See application file for complete search history.

(56) References Cited

U.S. PATENT DOCUMENTS

| | | | |
|---|---|---|---|
| 5,898,291 A * | 4/1999 | Hall ............................. 320/121 |
| 7,075,194 B2 * | 7/2006 | Weidenheimer et al. ....... 307/71 |
| 8,575,894 B2 * | 11/2013 | White et al. .................. 320/119 |
| 2004/0101744 A1 * | 5/2004 | Suzuki ............................ 429/61 |
| 2010/0261043 A1 * | 10/2010 | Kim et al. ........................ 429/61 |
| 2011/0025258 A1 * | 2/2011 | Kim et al. ...................... 320/106 |

FOREIGN PATENT DOCUMENTS

DE    10 2011 014 133 A1    9/2012

* cited by examiner

*Primary Examiner* — Rina Duda
(74) *Attorney, Agent, or Firm* — Maginot, Moore & Beck LLP

(57) ABSTRACT

A method for regulating a battery voltage of a battery having a plurality of battery cells configured to be selectively bridged and connected to a battery string includes regulating the battery voltage to a desired nominal voltage by alternately driving the battery cells. The method further includes transmitting a value for a nominal switch-on probability to one or more driving circuits of the battery cells, with the result that the one or more battery cells are each switched with an allocated switch-on probability.

10 Claims, 3 Drawing Sheets

BATTERY HAVING A PLURALITY OF BATTERY CELLS AND METHOD FOR REGULATING A BATTERY VOLTAGE OF A BATTERY USING SWITCH-ON PROBABILITIES OF THE BATTERY CELLS

This application claims priority under 35 U.S.C. §119 to patent application no. DE 10 2013 201 489.9, filed on Jan. 30, 2013 in Germany, the disclosure of which is incorporated herein by reference in its entirety.

BACKGROUND

The present disclosure relates to a method for regulating a battery voltage of a battery comprising a plurality of battery cells which can be selectively bridged and connected to a battery string, in which case, in the method, the battery voltage is regulated to a desired nominal voltage by alternately driving the battery cells. The disclosure also relates to a battery comprising at least one battery string with a plurality of battery cells which can be bridged and connected to the battery string by means of driving, recording means for recording operating parameters of the battery cells, and regulating electronics for regulating a battery voltage.

It is becoming apparent that battery systems will be increasingly used in future both in stationary applications and in vehicles such as hybrid and electric vehicles. In order to be able to meet the requirements imposed on voltage and available power for a respective application, a large number of battery cells are connected in series, thus forming a battery string which provides a battery voltage. In order to achieve a high battery current, battery cells are often additionally connected in parallel.

Previous applications by the applicant described batteries having a battery string with a variable or adjustable battery voltage. This was achieved by activating a particular number of battery cells or battery modules, with the result that their total voltage corresponds to a desired nominal value for a battery voltage, in which case the other battery cells which are not required are deactivated or bridged. According to the prior art, coupling circuits of the battery cells are driven by microcontrollers for this purpose, the microcontrollers typically communicating with a central controller across DC isolation. The coupling circuits may be implemented by means of semiconductor switches, in particular MOSFET transistors, and a respective associated driver circuit. The semiconductor switches may be arranged in a half-bridge configuration or a full-bridge configuration. Furthermore, each of the coupling circuits may be provided for the purpose of switching an individual battery cell or a battery module having a plurality of battery cells. In this case, a central controller must inform a respective coupling circuit, via a communication interface or a signal transmission connection (communication bus), whether the battery cell or battery module is intended to be connected or bridged and which transistor is intended to be switched on and which is not.

However, the large amount of communication effort which is required is disadvantageous; this occurs to a particularly large extent when the number of battery modules or battery cells respectively switched by a coupling unit is reduced in order to achieve fine voltage graduation of the battery voltage. The large amount of communication effort lies, in particular, in the requirement for the battery cells or battery modules to generally have to be addressed and switched in real time in order to obtain a sufficiently robust and efficient battery system.

SUMMARY

The disclosure provides a method for regulating a battery voltage of a battery comprising a plurality of battery cells which can be selectively bridged and connected to a battery string. In the method, the battery voltage is regulated to a desired nominal voltage by alternately driving the battery cells. Furthermore, a nominal switch-on probability is respectively transmitted to one or more driving circuits of the battery cells, with the result that the one or more battery cells are switched with an allocated switch-on probability.

Another aspect of the disclosure also provides a motor vehicle which has an electric motor and is equipped with the battery according to the disclosure which supplies the electric motor with electrical energy.

An advantage of the disclosure is that it is possible to drastically reduce the amount of communication effort. This is achieved, in particular, by virtue of the fact that the battery cells are driven, according to the disclosure, by a central drive signal which comprises a nominal switch-on probability determined for all battery cells. In this case, the disclosure also reduces switching losses. This is also true, in particular, in comparison with driving of the battery cells using a pre-defined duty cycle, in which the battery cells are switched in every clock cycle. According to the disclosure, the frequency with which the battery cells are changed over can now be kept as low as possible.

The nominal switch-on probability is preferably transmitted to all battery cells in a battery string. According to one advantageous embodiment, the nominal switch-on probability also assumes the same value for each battery cell, which value is transmitted to all battery cells by means of a central drive signal. This has the advantage, inter alia, that the amount of communication effort inside the battery can be minimized.

The driving circuits arranged in the battery cells are each preferably used to implement a random function, according to which the respective battery cell is bridged or connected with the switch-on probability allocated to it.

Furthermore, in one preferred embodiment, regulating electronics arranged in the battery can be used to compare the desired nominal voltage of the battery with the instantaneous, actual battery voltage. The nominal switch-on probability is increased if it is determined in this case that the instantaneous battery voltage is smaller than the nominal voltage. Furthermore, the nominal switch-on probability can be reduced if it is determined that the instantaneous battery voltage is greater than the nominal voltage.

Therefore, the frequency of the changeover operations in the battery cells can be advantageously specified using the frequency of new probability specifications, in particular in the case of a constant or quasi-constant battery voltage.

In one particularly advantageous development of the disclosure, the central drive signal or the nominal switch-on probability is adapted on the basis of quality factors, as a result of which the switch-on probabilities are weighted. The quality factors are each preferably selected according to a present battery cell state. The nominal switch-on probability can be adapted in a particularly advantageous manner in a decentralized way in the battery cells or using the driving circuits of the battery cells. This makes it possible to smooth the output voltage of the battery string in a particularly reliable manner.

This also increases scalability of the battery in a particularly favorable manner. Particularly convenient two-stage driving is provided, in which a local or individual adaptation is advantageously carried out by using quality factors, which adaptation makes it possible, for example, to set a total battery voltage without all of the cell voltages having to be transmitted to a central controller and/or having to be evaluated there with respect to a decision regarding which battery cells are intended to be connected to the battery string and which battery cells are intended to be bridged. Since only an individual parameter also has to be set for the adaptation using the quality factors, the cell-specific regulation can be carried out in a simple manner. The quality factors can be calculated, according to the object, in a manner largely separate from the regulation of the battery voltage, which results in a high degree of flexibility, speed and reliability.

According to another advantageous development of the disclosure, each quality factor results from a calculation function which respectively combines a plurality of operating parameters of the relevant battery cell. The operating parameters may comprise, for example, a state of charge, an ageing state, a cell temperature, a cell internal pressure, a battery current direction and/or one or more other operating parameters. In this case, the operating parameters can be determined instantaneously, for example in real time, or can be updated at suitable intervals.

An average state of charge or an average ageing state can also be determined, with the result that an average value which applies to all battery cells is initially available. An item of information relating to an individual ageing state in comparison with an average ageing state can then be included in the regulating sequence by means of a corresponding high or low quality factor of a particular battery cell. Quality factors may also be updated and corrected individually and depending on the situation, requirements or application by virtue of a particular supplement or deduction being applied to a quality factor, for example if a cell temperature or an internal pressure of a particular battery cell changes.

Therefore, the quality factors are used to provide an indicator of the usability of a battery cell, which indicator is available and can be used at any time during operation of the battery, in which case the amount of effort needed to calculate the actual voltage regulation for the battery can be minimized. The voltage regulation can therefore react to instantaneous requirements, for example a quickly changing current requirement of a connected electric motor, with a fast response time.

According to one advantageous embodiment, a quality factor is respectively determined, on the basis of values of the respective operating parameters combined for a particular battery cell, as a number with a negative or positive sign. A dimensionless number is preferably used for the quality factor for this purpose. The manageability of the quality factor for further voltage regulation is therefore also simplified.

A special embodiment of the disclosure provides that, if a negative quality factor is determined for a particular battery cell, the switch-on probability allocated to the battery cell is reduced, and, if a positive quality factor is determined for a particular battery cell, the switch-on probability allocated to the battery cell is increased. This also makes it possible to dispense with complicated calculations, for example in a driver circuit which drives a battery cell according to an actual switch-on probability to be set.

One particularly advantageous embodiment of the disclosure provides for the switch-on probability of a battery cell to be set inside a probability window which is placed around such a nominal switch-on probability value which corresponds to an instantaneous magnitude of the central drive signal.

The central voltage regulation regulates only the average value, in which case the adaptations can be carried out locally and/or individually in both directions, that is to say in the direction of higher and lower probability.

According to another development of the disclosure, the quality factor is normalized. The quality factor can be normalized, for example, in such a manner that an upper edge or a lower edge of the probability window corresponds to a quality factor with the magnitude 1.

In this case, it is preferred for the probability window to be placed symmetrically around the nominal switch-on probability value.

A desired regulating behavior, in which, however, the state of all battery cells is also simultaneously concomitantly included, can be controlled in a particularly effective manner.

In one particular embodiment of the disclosure, a symmetrical probability window is selected having such a width that the lower edge and the upper edge of the probability window do not go beyond the probability limit values of 0 percent and 100 percent.

This makes it possible to ensure, inter alia, at any time that functioning adjustment is carried out in a truly effective range using finitely large quality factors.

The disclosure can be applied to a multiplicity of regulating mechanisms in which use is made of a drive signal which is intended for all battery cells or battery modules.

The disclosure can be used, in particular, in a regulating operation which is carried out using a pulse-width-modulated signal. In order to regulate the battery voltage, one advantageous embodiment provides for a pulse-width-modulated signal, in particular, to be used as the central drive signal. Alternatively or additionally, provision is made in this case for the regulating operation to be configured in such a manner that the pulse-width-modulated signal is used as a controlled variable in a control loop for regulating the battery voltage.

According to the disclosure, the battery voltage can therefore be functionally regulated in a special way in a manner independent of the state of charge of the battery cells. This can be achieved, in particular, by virtue of the fact that, in the case of a relatively high average state of charge of the cells for example, a different pulse-width-modulated signal having a lower duty cycle is generated via the regulating unit for the purpose of connecting the cells.

The battery according to the disclosure is preferably a lithium ion battery.

Advantageous developments of the disclosure are stated in the subclaims and are described in the description.

BRIEF DESCRIPTION OF THE DRAWINGS

Exemplary embodiments of the disclosure are described in detail below with reference to the accompanying drawings. In the drawings.

DETAILED DESCRIPTION

Figure 1:
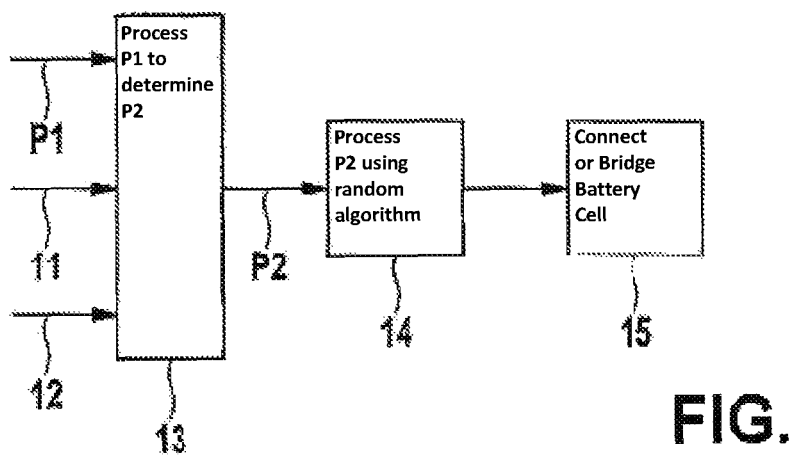
FIG. 1 shows a process flowchart taking into account operating parameters for driving a switchable battery cell according to one embodiment of the disclosure.

FIG. 1 shows a process flowchart from which the principle of taking into account instantaneous operating parameters 11, 12 in the battery cell when driving a switchable battery cell is clear. In this case, P1 denotes a nominal switch-on probability or probability specification which is passed to a battery cell or driving electronics responsible for a battery cell as a default value. The probability specification or the nominal switch-on probability P1 is generated, as a central drive signal, by a regulating unit (not illustrated) arranged in the battery. The nominal switch-on probability P1 is processed in step 13. This can be compared with a weighting function. The operating parameters 11, 12, for example the state of charge and ageing state, which are relevant to the operation of the battery cell are processed in step 13. These may be first operating parameters 11 which affect the battery cell directly, for example the state of charge of the battery cell or else the cell temperature or the cell internal pressure. Furthermore, second operating parameters 12 of the battery are also taken into account, which second operating parameters are measured or determined in other battery cells or for the battery as a whole and likewise influence the driving to be carried out of the battery cell under consideration here. For example, an operating parameter 12 of the battery may be an average state of charge of all battery cells, whereupon a state of charge of the battery cell under consideration is related to the average state of charge according to the method. An actual switch-on probability P2 is output as the result of the processing according to step 13, which actual switch-on probability takes into account the battery cell state and is then used to actually drive the battery cell.

The actual switch-on probability P2 determined is also processed for the respective battery cell in step 14 using a random algorithm.

Therefore, the battery cells as a whole can be driven according to the respective actual switch-on probabilities P2, the regulating operation revealing that the total voltage of the battery corresponds to the desired nominal switch-on probability P1. At the same time, it is ensured that there is no unwanted synchronization of the battery cells which results in undesirable voltage ripples in the battery voltage.

In step 15, the respective battery cell is driven with the actual switch-on probability P2 determined and is alternately switched on and off, that is to say is connected to the battery string or is conductively bridged.

The procedure according to FIG. 1 shows only the underlying general principle of individual adaptation of a driving switch-on probability for battery cells. According to the disclosure, the different measured and determined operating parameters 11, 12 for an individual battery cell, for example a cell voltage, a state of charge, an ageing state and so on, are also combined using a calculation function to form a quality factor G, the quality factor G accordingly being normalized, for example to +/−1.

Figure 2:
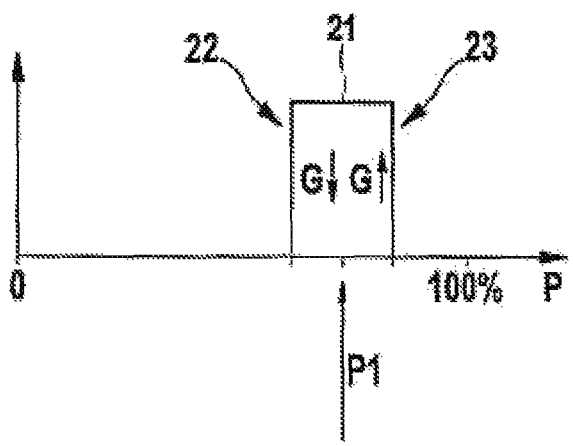
FIG. 2 shows a graph containing the position and distribution of the switch-on probability for a particular battery cell according to one embodiment of the disclosure.
Figure 3:
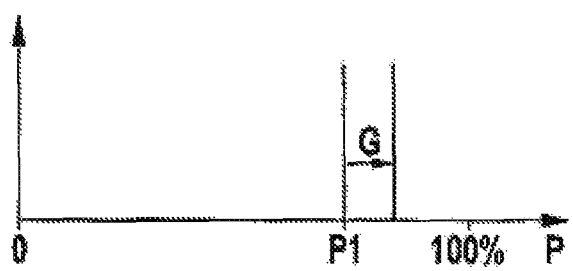
FIG. 3 shows a graph illustrating the change in the switch-on probability caused by a quality factor in the battery cell according to one embodiment of the disclosure.

The following FIGS. 2 to 4 show how a determined quality factor influences a nominal switch-on probability P1 in particular embodiments of the disclosure.

FIG. 2 shows a graph containing the position of the nominal switch-on probability P1 and the distribution of the switch-on probability P for a particular battery cell. The nominal switch-on probability P1 which results from the central drive signal assumes an exemplary value of between 0% and 100% in this case. With a value of 0%, the battery cell would always be switched off and bridged, whereas 100% means that the battery cell is constantly switched on.

Furthermore, as shown in FIG. 2, a probability window 21 is arranged around the specified nominal switch-on probability P1, in which case, for a quality factor G of +1, the switch-on probability P for the individual cell is placed at the right-hand or upper edge 23 of the probability window 21 and, for a quality factor G of −1, the switch-on probability P is placed at the left-hand or lower edge 22 of the probability window 21. The switch-on probability P which is specific to the battery cell is therefore shifted to the right or to the left starting from a value corresponding to the nominal switch-on probability P1 or starting from a value corresponding to the central drive signal, that is to say is increased or reduced. FIG. 3 explicitly illustrates, in particular, a shift to the right to a higher value of the switch-on probability P.

Figure 4A:
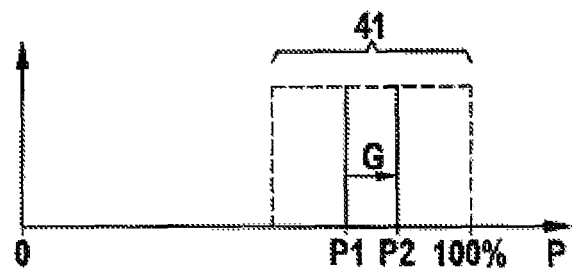
FIGS. 4a, 4b, and 4c show graphs illustrating the available possible widths for a switch-on probability window according to another embodiment of the disclosure.
Figure 4B:
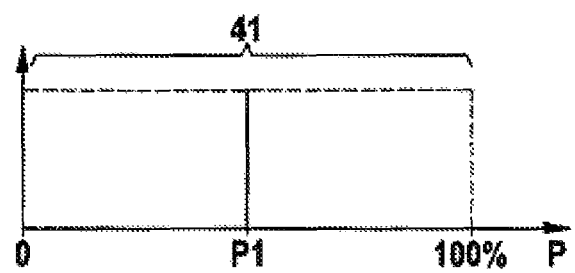
Figure 4C:
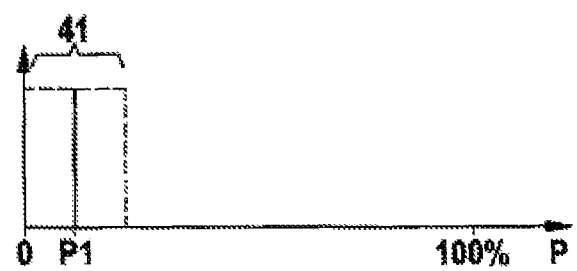

FIGS. 4a, 4b, and 4c show graphs illustrating the available possible widths 41 for a switch-on probability window 21. The embodiment shown in FIG. 4 proposes placing the probability window 21 symmetrically around the switch-on probability P1 specified by the central controller. In this case, the width 41 of the probability window 21 is selected in such a manner that it reaches, at most, the 0% or 100% value. Alternatively, the width 41 of the probability window 21 can also be restricted to a maximum value, in particular for average switch-on probabilities P.

Although quality factors G are used in each case for the driving operation in the exemplary embodiments discussed here, the disclosure is not restricted to these particular embodiments with quality factors but rather can also be advantageously used without quality factors.

Figure 5:
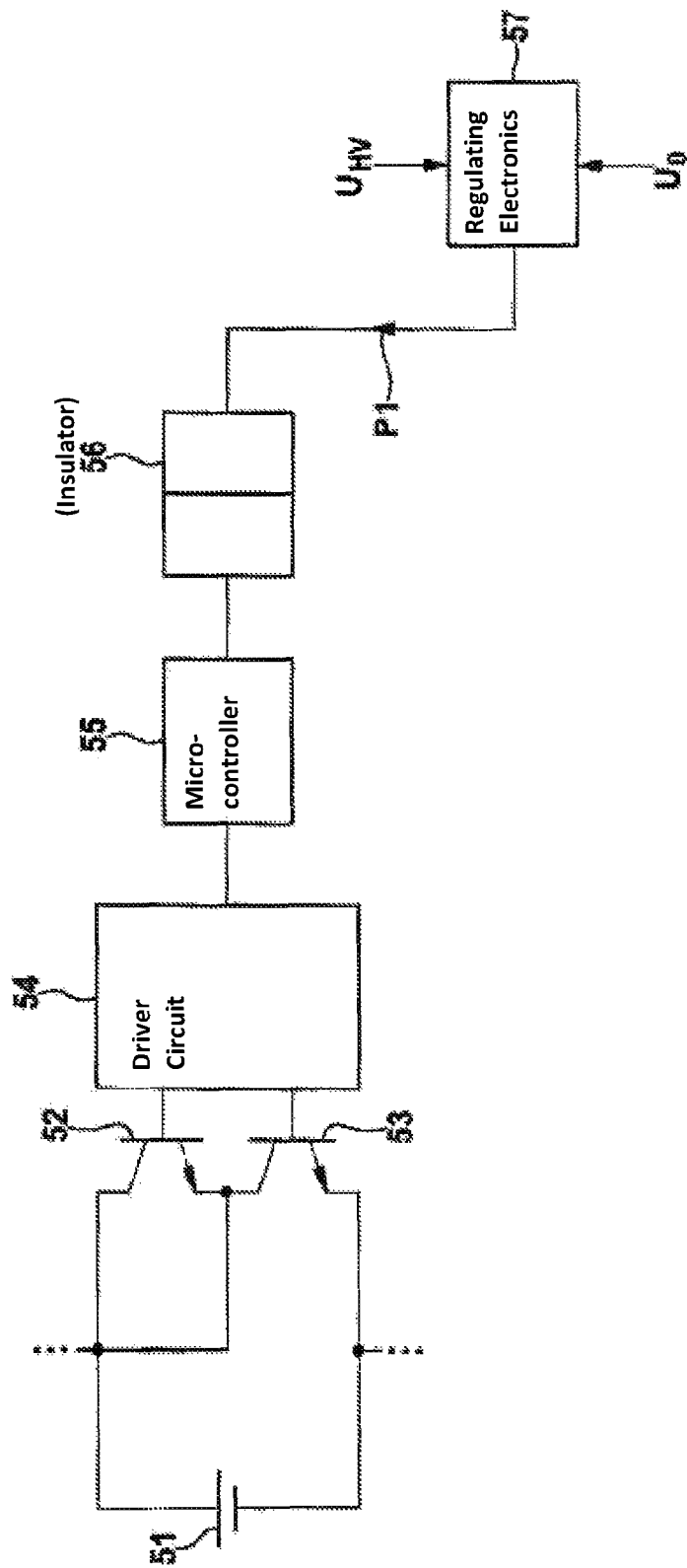
FIG. 5 shows a basic circuit diagram for the process of driving a battery cell with a nominal switch-on probability according to one embodiment of the disclosure.

FIG. 5 shows a basic circuit diagram for the process of driving a battery cell 51 with a nominal switch-on probability P1 according to one embodiment of the disclosure. Regulating electronics 57 compare the instantaneous battery voltage $U_{HV}$ with the desired nominal voltage $U_0$. The regulating electronics 57 centrally responsible for all battery cells 51 in the battery generate a corresponding drive signal which comprises the nominal switch-on probability P1 and is transmitted to all battery cells 51, of which only a single battery cell 51 is explicitly illustrated in the drawing. As also illustrated in FIG. 5, the drive signal and the nominal switch-on probability P1 can be transmitted via an insulator 56, which isolates the battery cell 51 from the high-voltage side of the battery, and can be passed to a microcontroller 55 associated with the battery cell 51. The microcontroller carries out a random algorithm which processes the nominal switch-on probability and optionally additionally a quality factor G specific to the battery cell. A driver circuit 54 for the transistors 52, 53 is driven on the basis of the random algorithm, which transistors are used to connect the battery cell 51 to the corresponding battery string or to conductively bridge said battery cell in the battery string.

In addition to the written disclosure of the disclosure above, reference is hereby explicitly made to the illustration of the disclosure in the drawings in FIGS. 1 to 5 in order to supplement the disclosure.

What is claimed is:

1. A method for regulating a battery voltage of a battery, the battery including a plurality of battery cells, each battery cell of the plurality of battery cells having a respective driving circuit configured to selectively bridge and connect the battery cell to a battery string, the battery string establishing the battery voltage of the battery, the method comprising:

determining, with regulating electronics, a nominal switch-on probability for the battery cells of the battery based on a desired nominal voltage, the nominal switch-on probability being such that if the each of the battery cells are connected to the battery string according to the nominal switch-on probability then the battery voltage of battery is within a predetermined range of the desired nominal voltage;

transmitting, with the regulating electronics, the nominal switch-on probability to at least one of the respective driving circuits of the battery cells of the plurality of battery cells;

determining, with the respective driving circuits, an allocated switch-on probability for the respective battery cells based on the nominal switch-on probability; and selectively connecting battery cells of the plurality of battery cells to the battery string with the respective driving circuits based on the allocated switch-on probability for the respective battery cells.

2. The method according to claim 1, the transmitting of the nominal switch-on probability further comprising:

transmitting the nominal switch-on probability to the respective driving circuits of all of the battery cells of the plurality of battery cells.

3. The method according to claim 1, the connecting of battery cells of the plurality of battery cells further comprising:

implementing, with the respective driving circuits, a random function, the random function being configured to generate an output as a function of the allocated switch-on probability; and selectively connecting battery cells of the plurality of battery cells to the battery string with the respective driving circuits based on the output of the random function.

4. The method according to claim 1, further comprising:

comparing the desired nominal voltage with an instantaneous battery voltage the battery with regulating electronics;

increasing the nominal switch-on probability if the instantaneous battery voltage is smaller than the desired nominal voltage; and reducing the nominal switch-on probability if the instantaneous battery voltage is greater than the desired nominal voltage.

5. The method according to claim 1, the determining of the allocated switch-on probability further comprising:

determining the allocated switch-on probability as a value inside a probability window placed symmetrically around the nominal switch-on probability.

6. The method according to claim 5, the determining of the allocated switch-on probability further comprising:

determining a plurality of quality factors based on a present state of the respective battery cell of the plurality of battery cells; and determining the allocated switch-on probability based on the plurality of quality factors.

7. The method according to claim 6, the determining of the allocated switch-on probability further comprising:

determining each quality factor of the plurality of quality factors based on a plurality of operating parameters of the respective battery cell, the plurality of operating parameters including at least one of a state of charge, an ageing state, a cell temperature, a cell internal pressure, and a battery current direction.

8. The method according to claim 7, the determining of the allocated switch-on probability further comprising:

determining each quality factor of the plurality of quality factors as a dimensionless number having a negative or positive sign, wherein if a negative quality factor is determined for the respective battery cell, the allocated switch-on probability for the respective battery cell is reduced, and if a positive quality factor is determined for the particular battery cell, the allocated switch-on probability for the respective battery cell is increased, the quality factor being normalized, such that an upper edge of the probability window corresponds to a quality factor with a magnitude of 1 and a lower edge of the probability window corresponds to a quality factor with a magnitude of −1.

9. A battery comprising:

at least one battery string including a plurality of battery cells, each battery cell of the plurality of battery cells having a respective driving circuit configured to bridge and connected the battery cell to the battery string;

a recording device configured to record operating parameters of the battery cells of the plurality of battery cells; and regulating electronics configured (i) determine a nominal switch-on probability for the battery cells of the battery based on a desired nominal voltage, the nominal switch-on probability being such that if the each of the battery cells are connected to the battery string according to the nominal switch-on probability then the battery voltage of battery is within a predetermined range of the desired nominal voltage, and (ii) transmit the nominal switch-on probability to at least one of the respective driving circuits of the battery cells of the plurality of battery cells, wherein the driving circuits are configured to (i) determine an allocated switch-on probability for the respective battery cells based on the nominal switch-on probability and (ii) selectively connect battery cells of the plurality of battery cells to the battery string with the respective driving circuits based on the allocated switch-on probability for the respective battery cells.

10. A motor vehicle comprising:

an electric motor; and a battery configured to supply the electric motor with electrical energy, the battery including (i) at least one battery string including a plurality of battery cells, each battery cell of the plurality of battery cells having a respective driving circuit configured to be bridge and connected the battery cell to the battery string, (ii) a recording device configured to record operating parameters of the battery cells of the plurality of battery cells, and (iii) regulating electronics configured to determine a nominal switch-on probability for the battery cells of the battery based on a desired nominal voltage, and transmit the nominal switch-on probability to at least one of the respective driving circuits of the battery cells of the plurality of battery cells, the nominal switch-on probability being such that if the each of the battery cells are connected to the battery string according to the nominal switch-on probability then the battery voltage of battery is within a predetermined range of the desired nominal voltage, wherein the driving circuits are configured to (i) determine an allocated switch-on probability for the respective battery cells based on the nominal switch-on probability and (ii) selectively connect battery cells of the plurality of battery cells to the battery string with the respective driving circuits based on the allocated switch-on probability for the respective battery cells.

* * * * *